Dec. 2, 1958  J. A. HUTH  2,862,759
VERTICALLY EXPANSIBLE HOUSE TRAILER
Filed March 21, 1956  2 Sheets-Sheet 1
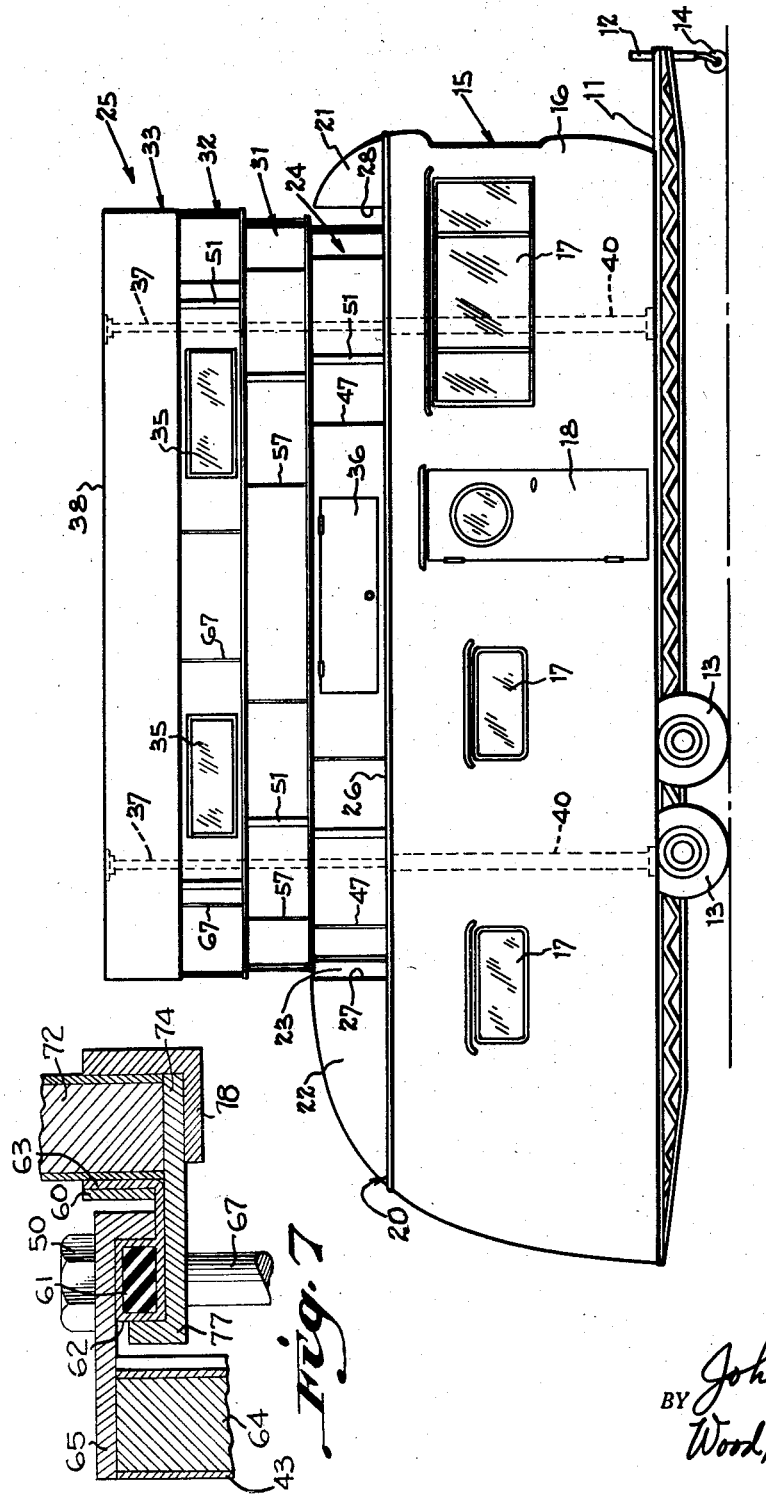
INVENTOR.
John A. Huth.
BY
Wood, Herron & Evans.
ATTORNEYS.

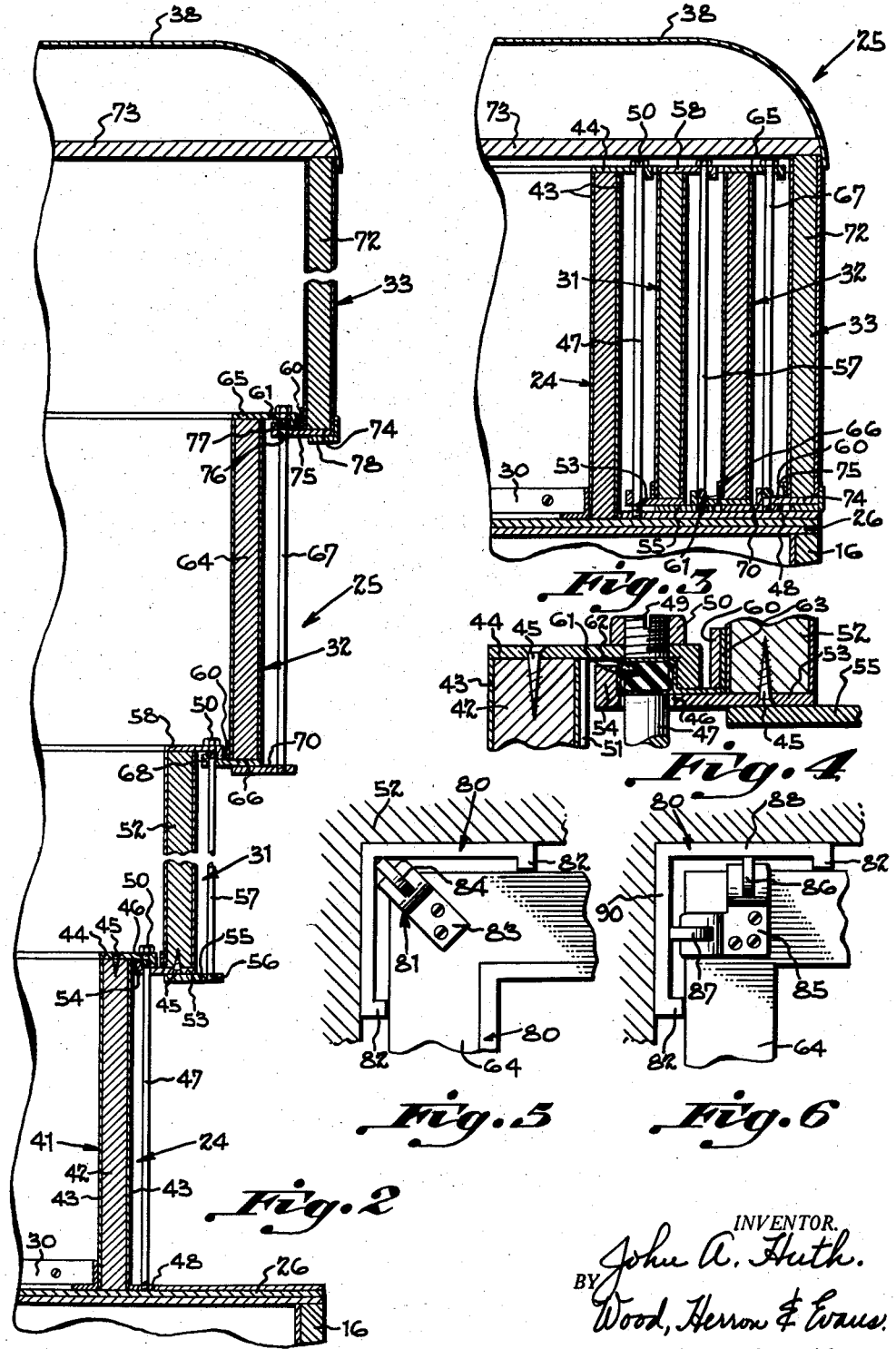

United States Patent Office 2,862,759
Patented Dec. 2, 1958

2,862,759

VERTICALLY EXPANSIBLE HOUSE TRAILER

John A. Huth, Cincinnati, Ohio, assignor to William A. Goebel, Reading, Ohio

Application March 21, 1956, Serial No. 572,956

4 Claims. (Cl. 296—23)

The present invention relates to trailer vehicles and is more particularly directed to a house trailer having a conventional first floor compartment and a vertically expansible, full height second floor compartment.

In recent years there has been a tendency in the trailer industry to substantially increase the living space provided in house trailers, or "mobile homes." This increase in space has usually been obtained by increasing the length of the trailer until today many trailers are fifty feet or more in length. While the added space provided in such a trailer has substantially added to its livability, it has at the same time greatly reduced the unit's mobility, since the average automobile is no longer able to pull the trailer. Furthermore, many states have laws limiting the length of trailers while others require special licenses for units over a certain length. These difficulties greatly limit the utility of such large trailers especially for people who must move from place to place at relatively frequent intervals.

The present trailer, including a second floor, is adapted to provide all of the living space of a large single floor trailer and yet is quite easily moved since it is only a little over half the length of a large single floor unit. To further facilitate moving the present trailer, the second floor compartment is constructed so that it can be collapsed into a compact area in a space provided in the upper portion of the main trailer body. Consequently for traveling purposes the present trailer is of a length corresponding to a relatively small conventional unit and is of a height only a foot or so greater than such a unit.

A preferred embodiment of a trailer constructed in accordance with the present invention comprises a generally conventional main body portion mounted on wheels and provided with suitable attachment means for securance to a vehicle. The main body forms a conventional first floor compartment while the roof of the main body supports an auxilary second floor compartment. An interior stairway is provided for entering the upper compartment from the lower one.

The side and end walls of the upper compartment include a plurality of telescopically nestable sections which can be extended to provide a full height second floor and can be nested in an area at the top of the main trailer body. Suitable means such as power driven elevating screws, or the like, are provided for raising and lowering the upper compartment walls when desired. When the trailer is to be moved, the upper compartment is collapsed by actuating the power means to bring the upper walls into a nested position; in this position the walls do not in any way interfere with the use of the lower compartment. Then when the trailer is stopped, the upper walls are extended by the power means to provide a second floor which is highly advantageous for use as one or more bedrooms.

One of the principal difficulties encountered in providing a telescopically expandable second floor is that of guiding the sections in their movements between the nested position and the extended position. This difficulty is greatly increased by a combination of factors unique to trailer constructions. In the first place, because of their very nature, trailers are continually exposed to the elements which often include such corrosive agents as salt water spray and the like. Consequently, any exposed guiding elements are apt to become corroded, with tendency to bind with any engaging member. Furthermore, a trailer rarely is placed on absolutely level ground, so that frequently it is necessary to raise and lower the upper floor while the trailer is slightly inclined to vertical. This greatly increases the strain on some parts of the guiding mechanism and produces a tendency of parts to lock in place. Additionally, in order to conserve weight, the trailer walls are formed of material such as aluminum covered wooden panels or impregnated fiberboard having only a limited amount of rigidity. After periods of use these walls are apt to warp or sag slightly, again causing a tendency of wall sections to bind.

The present invention is predicated upon the concept of loosely guiding the telescopic sections relative to one another in all positions intermediate the nested position and the expanded position; while firmly locking the plates relative to one another in their two extreme positions. Thus, by providing a substantial amount of play in the guiding means during movement of the roof sections, all tendency of the sections to bind is eliminated and the roof can readily be raised and lowered even if parts have corroded, or the walls have warped or sagged or the trailer is not on level ground. However, in their expanded position, the wall sections are firmly locked together to form a completely rigid second floor compartment. Also, in their nested position the wall sections are firmly held in place so that they do not shift about when the trailer is in motion.

More specifically an expandable trailer compartment constructed in accordance with this invention comprises a plurality of nested wall sections, the innermost section being secured to the roof of the main trailer body with each upwardly adjacent section being spaced slightly outwardly of the section beneath it. The uppermost section carries a roof for enclosing the upper compartment. Each wall section, except the roof section, is provided with an outwardly extending sealing flange secured to the upper edge of the section. The bottom of each section carries an inwardly extending locking flange which carries a resilient sealing strip adapted to be tightly compressed between the locking flange and sealing flange. A mounting strip is also secured to the lower edge of each section and extends outwardly beyond the section and below the locking flange.

Each section also includes a plurality of guide rods extending vertically along the outer surface of the section between the mounting strip and sealing flange. The locking flange of the next upper section is provided with a plurality of spaced openings of a diameter appreciably larger than the diameter of the guide rods so that the rods pass through and are loosely embraced by the locking flange of the next upper section. During vertical movement, each section is then loosely guided by the cooperative engagement of its locking flange with the guide rods carried by the next lower section.

A further advantage of the present upper compartment construction is that it is extremely easy to assemble. During assembly, the stationary section is first joined to the main body roof in any suitable manner. Thereafter, the movable sections are placed on the roof in a nested arrangement, the locking flanges, mounting strips and resilient strips, having previously been joined to the lower edges of the movable sections. Next the sealing flanges are mounted on the upper edges of the sections and finally the guide rods, each of which is threaded at each end and is provided with a slot at its upper end, are passed downwardly through the registered openings in the sealing flange of one section, the locking flange and resilient strip of the next outwardly disposed section and are threadably engaged with the mounting strip of the first section. A nut is then threaded over the upper end of the guide rod and is tightened against the sealing flange. After all of the guide rods have been secured in place, the assembly is completed by placing the roof over the uppermost section in any suitable manner.

These and other objects and advantages of the present invention will be more readily apparent from the following detailed description of the drawings illustrating a preferred embodiment of the invention.

In the drawings:

Figure 1 is a side elevational view of a trailer constructed in accordance with the principles of the present invention, showing the second story compartment in a vertically extended position.

Figure 2 is a transverse cross-sectional view taken through a side wall of the upper compartment of the trailer with the upper compartment extended as shown in Figure 1.

Figure 3 is a cross-sectional view similar to Figure 2 showing the compartment walls in their nested position.

Figure 4 is an enlarged cross-sectional view through two wall sections showing details of the weather seal.

Figure 5 is a partial top elevational view of a corner of two sections of the upper compartment showing the corner guide rails.

Figure 6 is a view similar to Figure 5 of a modified form of a corner guide frame.

Figure 7 is an enlarged cross-sectional view similar to Figure 4 showing details of the weather seal between sections 32 and 33.

A preferred embodiment of trailer constructed in accordance with the present invention is shown in Figure 1. As there shown the trailer comprises a conventional chassis frame 11 formed of longitudinal steel beams carrying wooden cross members. Frame 11 is provided with a hitch 12 disposed at its forward end and adapted to be secured to a towing car. Main load bearing wheels 13 are journaled at intermediate points on frame 11 and in addition a small auxiliary wheel 14 is provided at the forward end of the frame to support that member in a horizontal position when the frame is disengaged from a towing vehicle. The frame carries main trailer body 15 of generally conventional construction and including side walls 16 provided with suitable windows 17 and a door 18. The roof 20 of the main body portion includes a forward raised section 21 and a rearward raised section 22, intermediate the two of which is a recessed well portion 23. Mounted within well portion 23 is the lowermost section 24 of the second floor compartment 25.

Stationary section 24 comprises four upstanding panels arranged in a rectangle on top of horizontal wall 26 forming the ceiling of the lower compartment and the floor of the upper compartment. The side panels of section 24 extend parallel to the side walls of the main body and are spaced inwardly therefrom a small distance, as best shown in Figures 2 and 3. The two end panels of section 24 extend transversely across the ends of the side panels, parallel to the front and rear walls of the main trailer body. These walls are spaced slightly inwardly of transverse walls 27 and 28 of the front and rear sections 21 and 22 of the roof. The panels comprising section 24 may be secured to wall 26 in any suitable manner; for example, they may be joined to angle brackets 30 which are in turn bolted or otherwise secured to wall 26.

Top compartment 25 comprises, in addition to stationary section 24, vertically movable sections 31, 32 and 33. Each of these sections is constituted by two end panels and two side panels secured together to form an upstanding rectangle member. The sections are telescopically disposed relative to one another and are adapted to be shifted to a vertically extended position as shown in Figure 1 in which the top of the uppermost section 33 is preferably 6 to 7 feet above horizontal wall 26. The sections can also be shifted to a nested position as shown in Figure 3, with the four sections telescopically nested within one and other, so that the overall height of the compartment is not appreciably greater than the height of section 24. It will be appreciated that when the upper compartment is extended, it constitutes a full height second story of the trailer and is accessible through an opening formed in horizontal wall 26, which connects with a stairway leading downwardly from that wall to the main floor of the trailer. The upper compartment is preferably provided with suitable windows 35 mounted in one section, such as top section 32. Windows may be provided in other sections if desired; these are preferably of a sliding type so that they do not extend inwardly or outwardly beyond the sections. In addition, a hinged emergency door 36 may be provided in section 24 to allow occupants of the upper compartment to escape from the compartment in case of emergency.

Suitable power means are provided for raising and lowering the sections constituting the upper compartment. These power means constitute no part of the present invention and it is not considered necessary to describe them in detail here. However, one suitable form of elevating mechanism is disclosed in the application of William J. Schenkel et al. for "Collapsible One and Two Story House Trailer," Serial No. 311,618, now Patent No. 2,739,833.

The details of construction of upper compartment 25 are best shown in Figures 2 through 6. It will be understood that each of the four panels forming a wall section are substantially identical; therefore, only one wall will be described. The lowermost section 24 of the upper compartment includes four composite panels 41 each of which comprises a center insulating slab 42 formed of wood, plastic, impregnated fiber board or the like sandwiched between inner and outer sheets 43 formed of aluminum or other suitable sheet material. Panel 24 is joined to angle iron 30 which is also secured to horizontal wall 26 in any suitable manner. Panel 41 also carries an outwardly extending sealing flange 44 which extends along the entire length of the panel and is secured thereto as by means of recessed screws 45. Flange 44 is provided with a plurality of spaced openings 46 adapted to receive elongated guide rods 47 which extend downwardly along the outer face of the panel in spaced relationship therewith. The lower ends of the rods are in threaded engagement with a strip 48 carried by horizontal wall 26 and extending outwardly from panel 41 to the edge of side wall 16. In the preferred embodiment rods 47 are threaded only adjacent each end so that substantially the entire length of the rods is smooth and is adapted to function a guide surface. The upper end of rod 47 is provided with a suitable slot 49 which can be engaged by a screw driver to tighten the rod during assembly of the trailer. A nut 50 is threaded over the upper end of the rod and is tightened against sealing flange 44. Panel 41 also supports a plurality of spaced vertical bearing strips 51 secured to the outer surface of the panel. The function of these strips is explained below.

The construction of section 31 is generally similar to that of stationary section 24. The panels 52 of section 31 are joined together to form a rectangle slightly larger than frame 24, each of the panels of section 31 being disposed parallel to the corresponding panel of section 24 and spaced slightly outwardly therefrom. Each of the panels of section 31 carries a locking flange 53 joined to the bottom edge of the panel as by means of countersunk screws 45. Each locking flange extends inwardly from panel 52 and preferably terminates in an upturned arm 54 disposed adjacent to the adjacent panel 41 of section 24. Arm 54 is adapted to abut bearing strips 44 carried by panel 41 to maintain section 31 aligned with stationary section 24. A mounting strip 55 is also secured to the bottom of panel 52 beneath the locking strip. This mounting strip extends outwardly beyond panel 52 and is provided with a plurality of threaded apertures 56 adapted to receive the threaded ends of a second set of elongated rods 57. The upper ends of these rods are provided with nuts in engagement with sealing flange 58 mounted along the upper edge of the panel 52 in any suitable manner. A metal filler bar 60 extends along the interior surface of panel 52 at the lower edge thereof. The function of this strip is to prevent small articles from entering the space between panel 52 and sealing flange 44.

The seal between sections 24 and 31 is best shown in Figure 4, it being understood that a similar seal is provided between sections 31 and 32 and 33. This seal includes a resilient strip 61 which is carried by locking flange 53 and is adapted to be compressed between upturned arm 54 of locking flange 53 and sealing flange 44 secured to the upper end of panel 41. In the preferred embodiment, strip 61 is formed of rubber, neoprene or some other resilient material having an enlarged portion 62 and a flap extension 63 inserted between the lower surface of panel 41 and filler bar 60.

Section 32 is generally similar to section 31 except that the panels 64 of section 32 are slightly longer than the corresponding panels of section 31 and are spaced slightly outwardly therefrom. Each of the panels 64 carries an outwardly extending sealing flange 65 disposed along the upper edge of the panel and an outwardly and inwardly extending locking flange 66 secured to the bottom edge of the panel. Locking flange 66 is provided with a plurality of apertures for loosely receiving guide rods 67 and also includes an upwardly turned arm 68 adapted to compress resilient strip 61 against sealing flange 58. This arm is also disposed for abutment with bearing strips 51 carried by panel 52. Section 32 additionally is provided with an outwardly extending mounting strip 70 having a series of threaded apertures disposed for engagement with guide rods 67 carrying nuts 50 in engagement with sealing flange 65. This mounting strip 70 is disposed beneath locking flange 66 and is of sufficient thickness to engage strips 48 and support panel 52 when the panels are nested as shown in Figure 3.

The uppermost section 33 of the upper compartment comprises composite panels 72 similar to panels 42, 52 and 64. These panels 72 are slightly longer than corresponding panels 64 and extend parallel to the corresponding panels in outwardly spaced relationship therewith. The upper ends of panels 72 carry a roof 38 for the top compartment. This roof is formed from sheet aluminum or other suitable material and is secured to suitable cross beams (not shown) and the side and end panels in any suitable manner. Panels 72 also carry a ceiling wall 73 for the interior of the upper compartment. This wall may be formed of plywood, plaster board or any other suitable material. The lower edge of panels 72 is provided with a locking flange 74 having an inwardly extending portion 75 including apertures 76 adapted to loosely receive rods 67. The locking flange also includes an upwardly turned arm 77 disposed adjacent to panel 64 and adapted to compress resilient strip 61 carried above the flange against sealing flange 65 when the panels are vertically extended as shown in Figure 2. This arm is also adapted to abut bearing strips mounted on the outer surface of panel 64 to keep section 32 in alignment. Panel 72 preferably is provided with a spacer strip 78 disposed for engagement with member 48 when the upper compartment is lowered to support section 32 and the roof directly on horizontal wall 26.

As shown in Figures 5 and 6 sections 31, 32 and 33 are also guided in their vertical movements by means of corner guide tracks 80 and rollers indicated generally at 81. Guide tracks 80 are mounted in the four corners of sections 31, 32 and 33. These tracks are of a generally right angular configuration and may be formed of any suitable material such as angle irons or aluminum extrusions or the like. The ends of the two arms of the rails abut the section panels and are preferably provided with short inwardly turned flanges 82 adapted to keep excessive amounts of dirt from the guide rails. Cooperating roller brackets 83 are mounted on the top of the panels of sections 24, 31, and 32 at each of the four corners of these sections. As shown in Figure 5, each of the brackets 83 extends diagonally from the corner and includes an outwardly extending rotatably journalled guide roller 84 disposed for engagement with the corner of the guide rails. An alternate construction is shown in Figure 6, as there shown, guide rails 80 are mounted as described above. However, in this modification brackets 85 mounted on the top corners of sections 24, 31, and 32 are right angled and carry two rotatable journalled rollers 86 and 87 respectively adapted to track upon the arms 88 and 90 of the right angle guide rail.

In assembling the trailer, the chassis and main body portion 15 are constructed in a conventional manner. Horizontal wall 26 is secured in place to complete the assembly of the main body. Next the upper compartment is assembled by first securing the panels 41 of stationary section 24 to wall 26 by means of angle strips 30 or the like. Next, the panels of sections 31, 32, and 33 are placed in a nested relationship on wall 26 surrounding stationary section 24. It will be appreciated that before the upper panels are placed on wall 26, locking strips 53, 66 and 75, resilient strips 51, mounting strips 49, 70 and 78 and filling bars 60, are secured to the lower edges of their respective panels in any suitable manner, for example by means of countersunk screws. After the panels have been assembled in a nested position, sealing flanges 44, 58, and 65 are mounted along the upper edges of the panels constituting sections 24, 31 and 32. Finally, guide rods 47, 57 and 67 are inserted through the aligned apertures in the sealing flanges resilient strips and inward extensions of the locking flanges and are then rotated into firm threaded engagement with the outwardly extending mounting strips. Finally, the roof is mounted over section 33 and the upper compartment elevating screws 37 are secured in place.

When the trailer is transported from place to place, the upper compartment 25 is collapsed to the position shown in Figure 3, so that the overall height of the trailer does not exceed that of roof sections 21 and 22, since the entire upper compartment is disposed within well 23. When the upper compartment is in this collapsed position, it does not interfere in any way with the occupancy of the lower compartment formed by the main body portion of the trailer.

When it is desired to elevate the upper compartment, the power elevating means are actuated to raise upper section 33. As this section rises, it is guided relative to the next lower section 32 by the loose engagement of locking strip 75 with guide rods 67. Preferably, the upwardly turned arm of this flange is spaced slightly from the bearing strips carried by panels 64 so that in normal operation, as long as the section 33 is in line with section 32, these elements are not in engagement. Upward movement of section 33 is also guided by the rolling engagement of rollers 84 mounted on section 32 upon tracks 80 carried at the corners of section 33.

As section 33 is raised an additional amount, resilient strip 61 carried by locking flange 74 is compressed against sealing flange 65. Upon further elevation of section 33, section 32 is lifted along with section 33. Subsequently, section 31 is lifted in the same manner, until locking flange 53 of that section compresses sealing strip 61 against locking flange 44 of stationary section 24. The power elevating means are then automatically de-energized, but continue to support the uppermost section 33 in its elevated position. The sections are firmly locked in their extended position by the frictional engagement of their respective locking flanges with the resilient strips compressed between the flanges and the sealing flanges of the adjacent section. The compressed sealing strips also provide an effective weather-tight seal, preventing drafts or moisture seepage into the upper compartment.

When the upper compartment is collapsed, the power elevating means are actuated to lower section 33 which in turn causes sections 32 and 31 to move downwardly until they reach the nested position shown in Figure 3. In this position, the panels are supported by the engagement of their locking flanges with the outwardly extending portion of the adjacent locking flange, and by the engagement of spacer members 55, 70 and 78 with horizontal wall 26.

Having described my invention, I claim:

1. In a trailer vehicle having a main body, a vertically expansible compartment mounted on the top portion of said body and being in communication therewith, said compartment comprising a plurality of telescopic sections, the innermost of said sections being secured to the top portion of said body, a roof carried by the outermost of said sections, guide means for guiding said sections relative to one another during vertical movement of the sections, said guide means comprising an inwardly extending locking flange disposed along the lower edge of each of the moveable sections, an outwardly extending sealing flange mounted on the top edge of each of said sections except the outermost section, a plurality of vertical guide rods secured to the sealing flange of each of the sections except the outermost section and extending along the outer surface of said sections in spaced relationship therewith, the locking flange of each of said sections being provided with a plurality of spaced apertures of a diameter appreciably greater than said rods and adapted to receive said rods, a plurality of bearing strips carried by said sections and disposed for abutment with said locking flanges, a plurality of roller extending outwardly from the four corners of each of said sections except the outermost section, and cooperating vertical guide rails mounted on the inner surface of the four corners of each of said sections.

2. A wall section for a trailer vehicle having a main body portion, a vertically expansible compartment mounted on the top of said body in communication therewith, said section comprising four panels secured to form an upstanding rectangle, a locking flange mounted along the lower edge of each of said panels, each of said locking flanges comprising a portion extending inwardly from said panel, a mounting strip secured beneath said locking flange and extending outwardly from said panel, said outwardly extending mounting strip being provided with a plurality of spaced apertures, an outwardly extending sealing flange mounted on the top edge of each of said panels, a plurality of vertical guide rods passing downwardly through the openings in the sealing flanges and threadably engaging the apertures in said mounting strips, the inwardly extending portion of each of said locking flanges being provided with a plurality of spaced openings of a diameter appreciably greater than the diameter of said rods and being adapted to receive the rods of an adjacent section.

3. A wall section for a trailer vehicle having a main body portion, a vertically expansible compartment mounted on the top of said body in communication therewith, said section comprising four panels secured to form an upstanding rectangle, a locking flange mounted along the lower edge of each of said panels, each of said locking flanges comprising a portion extending inwardly from said panel, a mounting strip extending outwardly from said panel, said outwardly extending mounting strip being provided with a plurality of spaced apertures, an outwardly extending sealing flange mounted on the top edge of each of said panels, a plurality of vertical guide rods, each of said guide rods having a threaded upper end provided with a transverse slit, said rods passing downwardly through the openings in the sealing flanges and threadably engaging the apertures in said mounting strip, a nut threadably engaging the upper end of each of said guide rods in engagement with said sealing flange, the inwardly extending portion of each of said locking flanges being provided with a plurality of spaced openings of a diameter appreciably greater than the diameter of said rods and being adapted to receive the rods of an adjacent section.

4. A wall section for a trailer vehicle having a main body portion, a vertically expansible compartment mounted on the top of said body in communication therewith, said section comprising four panels secured to form an upstanding rectangle, a locking flange mounted along the lower edge of each of said panels, each of said locking flanges including a portion extending inwardly from said panel and having an upwardly extending arm, a mounting strip extending outwardly from said panel, said outwardly extending mounting strip being provided with a plurality of spaced apertures, a filling strip mounted on the inner surface of each panel adjacent to the lower edge thereof, an outwardly extending sealing flange mounted on the top edge of each of said panels, a resilient sealing strip disposed above said locking flange and including an extension clamped between said filling strip and said panel, a plurality of vertical guide rods passing downwardly through the openings in the sealing flanges and threadably engaging the apertures in said mounting strips, the inwardly extending portion of each of said locking flanges being provided with a plurality of spaced openings of a diameter appreciably greater than the diameter of said rods and being adapted to receive the rods of an adjacent section.

References Cited in the file of this patent

UNITED STATES PATENTS

| | | |
|---|---|---|
| 2,055,930 | Josephs | Sept. 29, 1936 |
| 2,168,069 | Miller | Aug. 1, 1939 |
| 2,494,013 | Tapp | Jan. 10, 1950 |
| 2,506,870 | Hairston | May 9, 1950 |
| 2,606,057 | Johnson | Aug. 5, 1952 |
| 2,739,833 | Schenkel et al. | Mar. 27, 1956 |